US012785314B2

(12) United States Patent
Yao

(10) Patent No.: US 12,785,314 B2
(45) Date of Patent: Nov. 3, 2026

(54) ELECTRICAL CONNECTOR WITH IMPROVED TERMINAL POSITIONING FEATURE

(71) Applicant: DONGGUAN LUXSHARE TECHNOLOGIES CO., LTD, Dongguan City (CN)

(72) Inventor: Kunlin Yao, Dongguan City (CN)

(73) Assignee: DONGGUAN LUXSHARE TECHNOLOGIES CO., LTD, Dongguan City (CN)

( * ) Notice: Subject to any disclaimer, the term of this patent is extended or adjusted under 35 U.S.C. 154(b) by 245 days.

(21) Appl. No.: 18/422,447

(22) Filed: Jan. 25, 2024

(65) Prior Publication Data

US 2024/0405470 A1 Dec. 5, 2024

(30) Foreign Application Priority Data

Jun. 2, 2023 (CN) ......................... 202310654820.1

(51) Int. Cl.
*H01R 13/424* (2006.01)
*H01R 27/02* (2006.01)

(52) U.S. Cl.
CPC ........... *H01R 13/424* (2013.01); *H01R 27/02* (2013.01)

(58) Field of Classification Search
CPC .............. H01R 13/424; H01R 13/6581; H01R 13/6597; H01R 12/721; H01R 12/727; H01R 27/02
See application file for complete search history.

(56) References Cited

U.S. PATENT DOCUMENTS 3,086,189 A 4/1963 Robbins
3,740,698 A * 6/1973 Jerominek ............. H01R 12/78 439/465
4,660,920 A * 4/1987 Shibano ............... H01R 12/721 439/724

(Continued)

FOREIGN PATENT DOCUMENTS

CN 103779692 A 5/2014
CN 203707391 U 7/2014

(Continued)

OTHER PUBLICATIONS

U.S. Office Action for U.S. Appl. No. 18/422,750, dated Feb. 24, 2026.

*Primary Examiner* — Thanh Tam T Le
(74) *Attorney, Agent, or Firm* — Birch, Stewart, Kolasch & Birch, LLP

(57) ABSTRACT

An electrical connector includes an insulating body and a first terminal module. The insulating body includes a first receiving space, a first mating port and a second mating port. The insulating body includes a first wall portion having a number of first grooves and a second wall having a number of second grooves. The first terminal module is at least partially installed in the first receiving space. The first terminal module includes a number of first terminals. Each first terminal includes a first main body, a first elastic arm and a second elastic arm. The first elastic arm and the second elastic arm at least partially extend into a corresponding first groove and a corresponding second groove, respectively, so that the first elastic arm and the second elastic arm can be better positioned.

19 Claims, 13 Drawing Sheets

(56) References Cited

U.S. PATENT DOCUMENTS

| | | | | |
|---|---|---|---|---|
| 4,983,132 | A | 1/1991 | Weidler | |
| 6,406,332 | B1 * | 6/2002 | Buican | H01R 12/721 439/631 |
| 7,845,985 | B2 * | 12/2010 | Brunker | H01R 12/732 439/631 |
| 7,976,344 | B2 * | 7/2011 | Brunker | H01R 13/504 439/631 |
| 8,057,263 | B1 * | 11/2011 | Howard | H01R 12/721 439/631 |
| 8,550,854 | B2 * | 10/2013 | Okano | H01R 12/7082 439/631 |
| 8,777,669 | B2 * | 7/2014 | Hu | H01R 12/714 439/159 |
| 9,478,880 | B2 * | 10/2016 | Yokoyama | H01R 12/7005 |
| 9,905,948 | B1 * | 2/2018 | Yu | H01R 12/7082 |
| 10,170,868 | B1 * | 1/2019 | Oyake | H01R 13/652 |
| 10,418,734 | B1 * | 9/2019 | Henry | H01R 13/424 |
| 10,553,971 | B1 | 2/2020 | Phillips et al. | |
| 10,651,585 | B2 * | 5/2020 | Chen | H01R 13/2435 |
| 10,651,602 | B2 | 5/2020 | Feng et al. | |
| 11,539,153 | B2 * | 12/2022 | Tsuji | H01R 13/24 |
| 11,749,929 | B2 * | 9/2023 | Saitou | H01R 24/60 439/701 |
| 2006/0014438 | A1 | 1/2006 | Regnier | |
| 2019/0326699 | A1 | 10/2019 | Chen et al. | |
| 2020/0244014 | A1 | 7/2020 | Lin | |
| 2022/0320778 | A1 | 10/2022 | Komatsu | |

FOREIGN PATENT DOCUMENTS

| | | | |
|---|---|---|---|
| CN | 108173018 | A | 6/2018 |
| CN | 209119436 | U | 7/2019 |
| CN | 209344456 | U | 9/2019 |
| CN | 110391526 | A | 10/2019 |
| CN | 113809560 | A | 12/2021 |
| CN | 115275666 | A | 11/2022 |
| CN | 116683219 | A | 9/2023 |
| JP | 2000-294352 | A | 10/2000 |
| JP | 2015-97180 | A | 5/2015 |
| TW | M580817 | U | 7/2019 |

* cited by examiner

ELECTRICAL CONNECTOR WITH IMPROVED TERMINAL POSITIONING FEATURE

CROSS-REFERENCE TO RELATED APPLICATION

This patent application claims priority of a Chinese Patent Application No. 202310654820.1, filed on Jun. 2, 2023 and titled "ELECTRICAL CONNECTOR", the entire content of which is incorporated herein by reference.

TECHNICAL FIELD

The present disclosure relates to an electrical connector, which belongs to a technical field of connectors.

BACKGROUND

The electrical connector in the related art includes an insulating body, a plurality of differential signal terminals installed in the insulating body, and a plurality of ground terminals of which each is disposed between two adjacent pairs of differential signal terminals. Each of the signal terminals and the ground terminals includes a main body and two elastic arms connected to two ends of the main body. The insulating body defines two mating ports. One mating module (for example, a mating connector) is plugged into one mating port so as to mate with one elastic arms, and another mating module (for example, another mating connector) is plugged into the other mating port so as to mate with the other elastic arms. The signal terminals and the ground terminals are installed to the insulating body through one of the mating ports. The insulating body defines a plurality of positioning grooves adjacent to the other mating port, so as to realize the positioning of the elastic arms at this position. However, not both elastic arms can be positioned, so there is a risk of poor contact between the mating module and the elastic arms that do not extend into the positioning grooves.

SUMMARY

An object of the present disclosure is to provide an electrical connector capable of making reliable contact with a mating module.

In order to achieve the above object, the present disclosure adopts the following technical solution: an electrical connector, including: an insulating body defining a first receiving space, a first mating port and a second mating port; both the first mating port and the second mating port communicating with the first receiving space; the insulating body including a first wall portion and a second wall portion; the first wall portion defining a plurality of first grooves; the second wall portion defining a plurality of second grooves; the plurality of first grooves and the plurality of second grooves communicating with the first receiving space; the plurality of first grooves being located adjacent to the first mating port; the plurality of second grooves being located adjacent to the second mating port; and a first terminal module at least partially installed in the first receiving space; the first terminal module including a plurality of first terminals; each first terminal including a first main body, a first elastic arm extending from one end of the first main body, and a second elastic arm extending from another end of the first main body; the first elastic arm at least partially extending into a corresponding first groove to be positioned by the corresponding first groove; the second elastic arm at least partially extending into a corresponding second groove to be positioned by the corresponding second groove.

In order to achieve the above object, the present disclosure adopts the following technical solution: an electrical connector, including: an insulating body defining a first receiving space, a first mating port extending through the insulating body along a first direction, and a second mating port extending through the insulating body along a direction opposite to the first direction; the first mating port and the second mating port being configured to receive a first mating module and a second mating module, respectively, along opposite directions; the insulating body including a first wall portion and a second wall portion which are located on a same side of the insulating body; the first wall portion defining a plurality of first grooves communicating with the first receiving space; the second wall portion defining a plurality of second grooves communicating with the first receiving space; the plurality of first grooves being disposed at intervals along a third direction; the plurality of second grooves being disposed at intervals along a fourth direction parallel to the third direction; and a first terminal module at least partially installed in the first receiving space along a second direction perpendicular to the first direction; the third direction being perpendicular to the first direction and the second direction; the first terminal module including a plurality of first terminals; each first terminal including a first main body, a first elastic arm and a second elastic arm; the first elastic arm and the second elastic arm extend along opposite directions from the first main body; a distal end of the first elastic arm at least partially extending into a corresponding first groove to be positioned by the corresponding first groove; a distal end of the second elastic arm at least partially extending into a corresponding second groove to be positioned by the corresponding second groove.

In order to achieve the above object, the present disclosure adopts the following technical solution: an electrical connector, including: an insulating body defining a first receiving space, a second receiving space, a first mating port extending through the insulating body along a first direction, and a second mating port extending through the insulating body along a direction opposite to the first direction; the first mating port and the second mating port being configured to receive a first mating module and a second mating module, respectively, along opposite directions; the insulating body including a first wall portion, a second wall portion, a first opening located between the first wall portion and the second wall portion, a third wall portion, a fourth wall portion and a second opening located between the third wall portion and the fourth wall portion; the first wall portion and the second wall portion being located on a first side of the insulating body; the third wall portion and the fourth wall portion being located on a second side of the insulating body opposite to the first side; the first wall portion defining a plurality of first grooves communicating with the first receiving space; the second wall portion defining a plurality of second grooves communicating with the first receiving space; the third wall portion defining a plurality of third grooves communicating with the second receiving space; the fourth wall portion defining a plurality of fourth grooves communicating with the second receiving space; a first terminal module at least partially installed into the first receiving space through the first opening along a second direction perpendicular to the first direction; the first terminal module including a plurality of first terminals; at least one first terminal including a first main body, a first elastic arm and a second elastic arm; the first elastic arm and the second elastic arm extend along opposite directions from the first main body; a distal end of the first elastic arm at least partially extending into a corresponding first groove to be positioned by the corresponding first groove; a distal end of the second elastic arm at least partially extending into a corresponding second groove to be positioned by the corresponding second groove; and a second terminal module at least partially installed into the second receiving space through the second opening along a direction opposite to the second direction; the second terminal module including a plurality of second terminals; at least one second terminal including a second main body, a third elastic arm and a fourth elastic arm; the third elastic arm and the fourth elastic arm extend along opposite directions from the second main body; a distal end of the third elastic arm at least partially extending into a corresponding third groove to be positioned by the corresponding third groove; a distal end of the fourth elastic arm at least partially extending into a corresponding fourth groove to be positioned by the corresponding fourth groove.

In the present disclosure, each first terminal includes the first elastic arm and the second elastic arm; the insulating body defines the first mating port and the second mating port correspondingly; a first mating module can be inserted into the first mating port so as to be in elastic contact with the first elastic arms; and a second mating module can be inserted into the second mating portion so as to be in elastic contact with the second elastic arms. As a result, bidirectional plugging of the electrical connector is realized. The insulating body positions the first elastic arms by setting the plurality of first grooves, so that the first mating module can form reliable contact with the first elastic arms. The insulating body positions the second elastic arms by setting the plurality of second grooves, so that the second mating module can form reliable contact with the second elastic arms.

DETAILED DESCRIPTION

Figure 1:
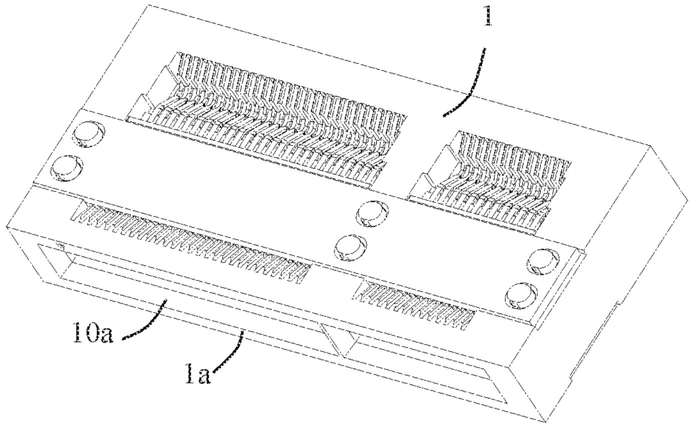
FIG. 1 is a schematic perspective view of an electrical connector in accordance with an embodiment of the present disclosure.

Exemplary embodiments will be described in detail here, examples of which are shown in drawings. When referring to the drawings below, unless otherwise indicated, same numerals in different drawings represent the same or similar elements. The examples described in the following exemplary embodiments do not represent all embodiments consistent with this application. Rather, they are merely examples of devices and methods consistent with some aspects of the application as detailed in the appended claims.

The terminology used in this application is only for the purpose of describing particular embodiments, and is not intended to limit this application. The singular forms “a”, “said”, and “the” used in this application and the appended claims are also intended to include plural forms unless the context clearly indicates other meanings.

It should be understood that the terms “first”, “second” and similar words used in the specification and claims of this application do not represent any order, quantity or importance, but are only used to distinguish different components. Similarly, “an” or “a” and other similar words do not mean a quantity limit, but mean that there is at least one; “multiple” or “a plurality of” means two or more than two. Unless otherwise noted, “front”, “rear”, “lower” and/or “upper” and similar words are for ease of description only and are not limited to one location or one spatial orientation. Similar words such as “include” or “comprise” mean that elements or objects appear before “include” or “comprise” cover elements or objects listed after “include” or “comprise” and their equivalents, and do not exclude other elements or objects. The term “a plurality of” mentioned in the present disclosure includes two or more.

Hereinafter, some embodiments of the present disclosure will be described in detail with reference to the accompanying drawings. In the case of no conflict, the following embodiments and features in the embodiments can be combined with each other.

Referring to FIG. 1 to FIG. 25, the present disclosure discloses an electrical connector configured to mate with at least one mating module (not shown). In some embodiments of the present disclosure, the mating module is an electronic module with a built-in circuit board as a tongue plate, wherein the tongue plate is configured to be inserted into the electrical connector. In other embodiments of the present disclosure, the mating module is a mating connector with a tongue plate. The tongue plate may be formed of a built-in circuit board with conductive pads, or an insulating block with conductive terminals. The at least one mating module includes a first mating module and a second mating module. The first mating module and the second mating module are at least partially inserted into the electrical connector. The electrical connector includes an insulating body 1, a first terminal module 2 installed to the insulating body 1, and a second terminal module 3 installed to the insulating body 1.

Figure 2:
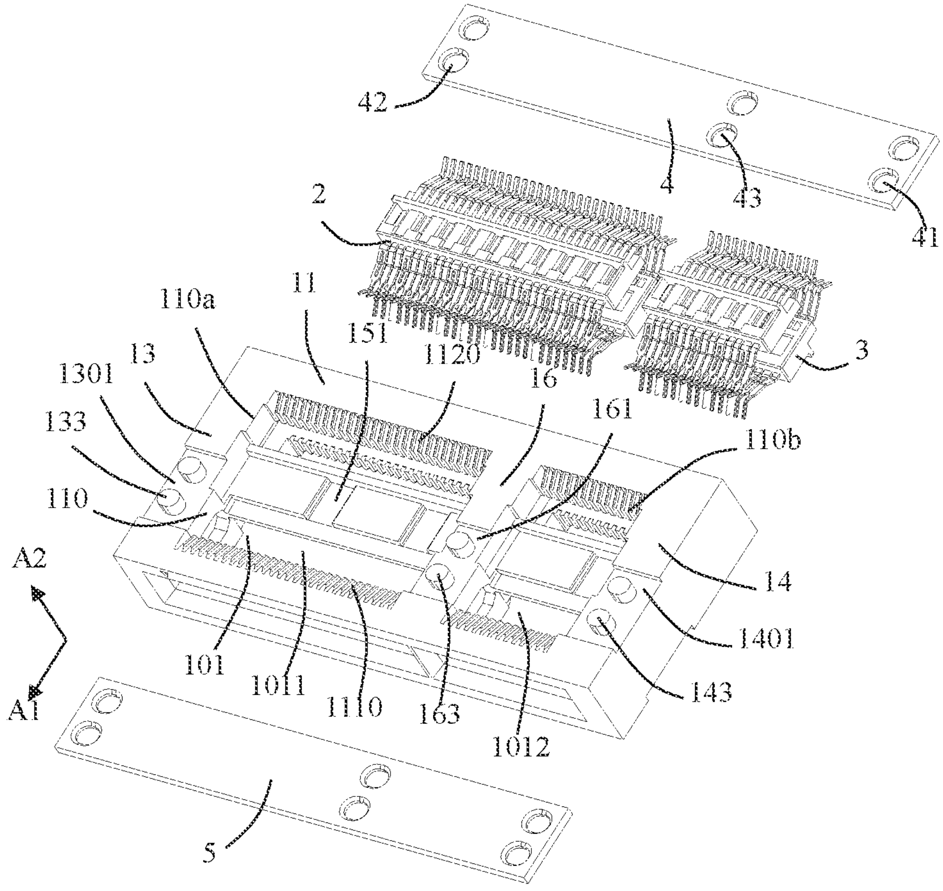
FIG. 2 is a perspective exploded view of FIG. 1.
Figure 6:
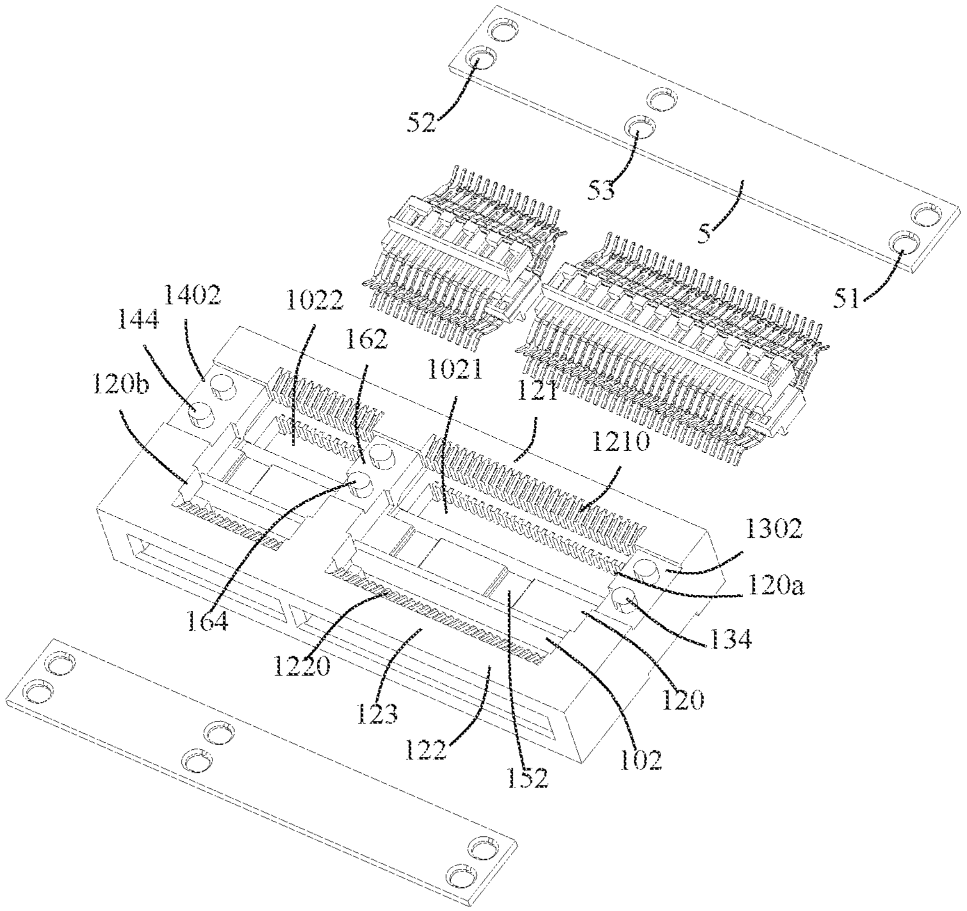
FIG. 6 is a perspective exploded view of FIG. 5.

Referring to FIG. 2 and FIG. 6, the insulating body 1 defines a receiving space. The receiving space includes a first receiving space 101 and a second receiving space 102.

The first receiving space 101 communicates with the second receiving space 102. The first terminal module 2 is at least partially installed in the first receiving space 101. The second terminal module 3 is at least partially installed in the second receiving space 102.

Figure 5:
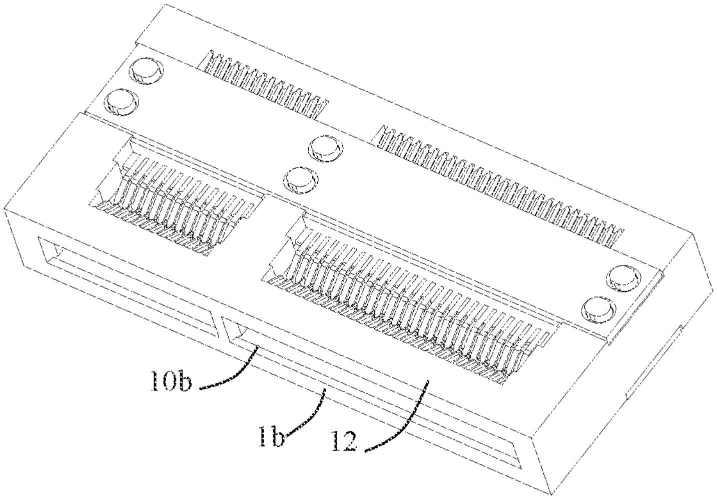
FIG. 5 is a schematic perspective view of FIG. 1 from another angle.

In the illustrated embodiment of the present disclosure, referring to FIG. 1 and FIG. 5, the insulating body 1 defines a first mating port 10*a* and a second mating port 10*b*. The first mating port 10*a* is configured to receive the first mating module. The second mating port 10*b* is configured to receive the second mating module. The first mating port 10*a* communicates with the first receiving space 101 and the second receiving space 102. The second mating port 10*b* communicates with the first receiving space 101 and the second receiving space 102. The insulating body 1 includes a first mating surface 1*a* and a second mating surface 1*b*. The first mating port 10*a* extends through the first mating surface 1*a*. The second mating port 10*b* extends through the second mating surface 1*b*. The first mating module and the second mating module can be inserted into the receiving space through the first mating port 10*a* and the second mating port 10*b*, respectively, so as to realize bidirectional plugging.

Referring to FIG. 2 and FIG. 5, the insulating body 1 includes a top wall portion 11, a bottom wall portion 12 opposite to the top wall portion 11, a first side wall portion 13 connecting one end of the top wall portion 11 and one end of the bottom wall portion 12, and a second side wall portion 14 connecting another end of the top wall portion 11 and another end of the bottom wall portion 12. The receiving space includes a space enclosed by the top wall portion 11, the bottom wall portion 12, the first side wall portion 13 and the second side wall portion 14.

In the illustrated embodiment of the present disclosure, referring to FIG. 2, the top wall portion 11 defines a first opening 110 communicating with the first receiving space 101. Part of the first terminal module 2 is located in the first receiving space 101, and another part of the first terminal module 2 is located in the first opening 110. An opening direction of the first opening 110 is different from opening directions of the first mating port 10*a* and the second mating port 10*b*. The first terminal module 2 is installed into the first receiving space 101 through the first opening 110, so that the first terminal module 2 can be assembled to the insulating body 1 along a thickness direction of the insulating body 1. A projection of the first terminal module 2 along the thickness direction of the insulating body 1 completely falls into the first opening 110, which is beneficial to reduce extrusion and deformation of the first terminal module 2 during installation, thereby facilitating assembly.

Figure 10:
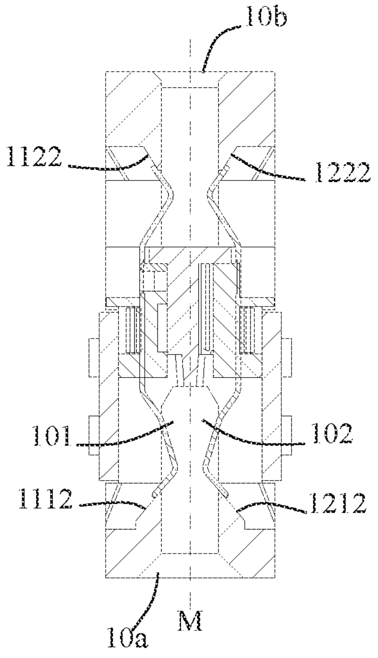
FIG. 10 is a schematic sectional view taken along line A-A in FIG. 9.
Figure 11:
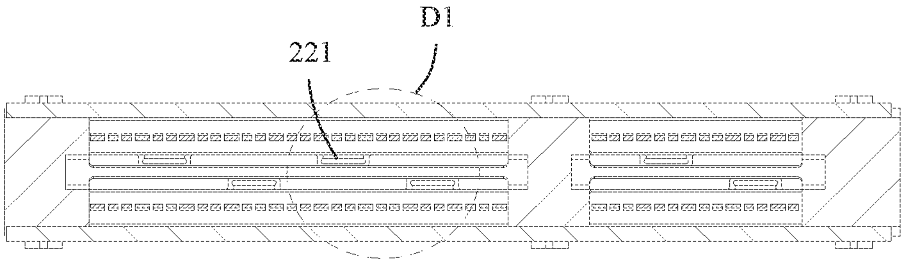
FIG. 11 is a schematic sectional view taken along line B-B in FIG. 9.
Figure 12:
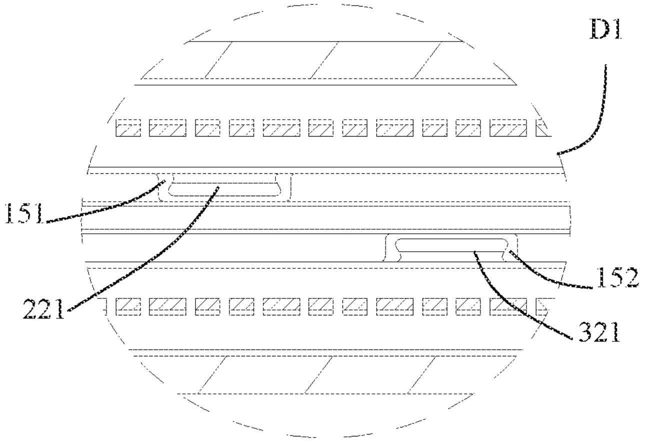
FIG. 12 is a partial enlarged view of area D1 in FIG. 11.

Specifically, referring to FIG. 10, the first mating port 10*a* extends along a first direction A1; and the second mating port 10*b* extends along a direction opposite to the first direction A1. The first opening 110 extends along a second direction A2 which is parallel to the thickness direction of the insulating body 1. The second direction A2 is perpendicular to the first direction A1.

Figure 9:
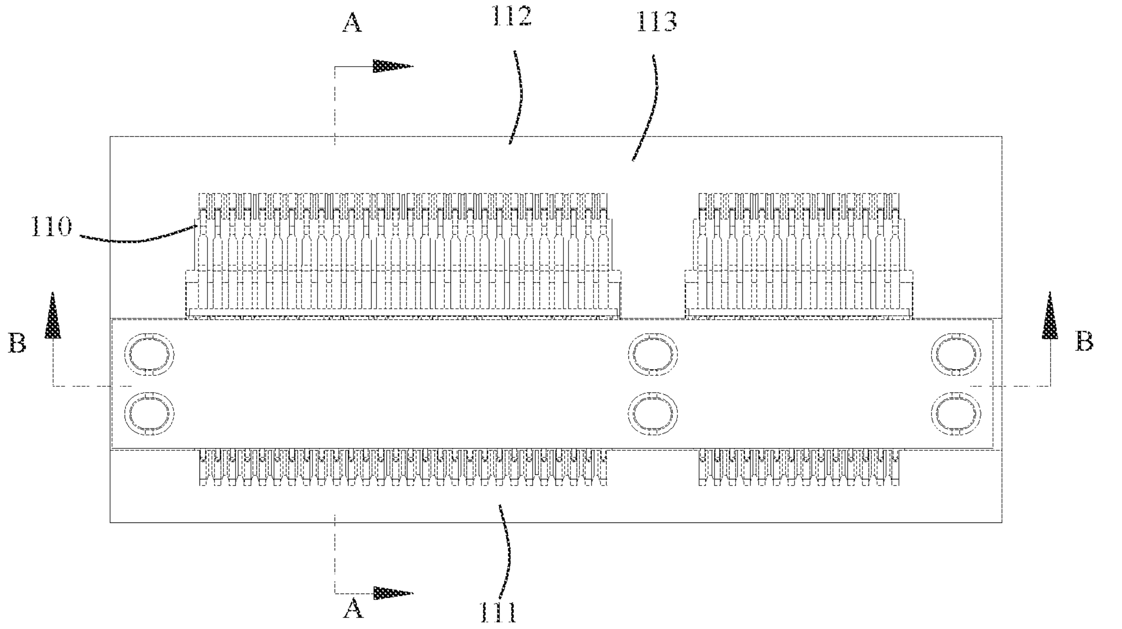
FIG. 9 is a top view of FIG. 1.

As shown in FIG. 9, the top wall portion 11 includes a first wall portion 111 and a second wall portion 112. The first opening 110 is located between the first wall portion 111 and the second wall portion 112. Referring to FIG. 2, the first wall portion 111 defines a plurality of first grooves 1110 disposed at intervals along a third direction perpendicular to the first direction A1 and the second direction A2. The second wall portion 112 defines a plurality of second grooves 1120 disposed at intervals along a fourth direction parallel to the third direction. Both the plurality of first grooves 1110 and the plurality of second grooves 1120 communicate with the first receiving space 101. The plurality of first grooves 1110 are located adjacent to the first mating port 10*a*. The plurality of second grooves 1120 are located adjacent to the second mating port 10*b*. The first grooves 1110 are configured to position corresponding first elastic arms 212. The second grooves 1120 are configured to position corresponding second elastic arms 213.

In the illustrated embodiment of the present disclosure, referring to FIG. 6, the bottom wall portion 12 defines a second opening 120 communicating with the second receiving space 102. Part of the second terminal module 3 is located in the second receiving space 102, and another part of the second terminal module 3 is located in the second opening 120. The second opening 120 extends along a direction opposite to the second direction A2. The second terminal module 3 is installed into the second receiving space 102 through the second opening 120, so that the second terminal module 3 can be assembled to the insulating body 1 along the thickness direction of the insulating body 1. A projection of the second terminal module 3 along the thickness direction of the insulating body 1 completely falls into the second opening 120, which is beneficial to reduce extrusion and deformation of the second terminal module 3 during installation, thereby facilitating assembly.

Referring to FIG. 6, the bottom wall portion 12 includes a third wall portion 121 and a fourth wall portion 122. The second opening 120 is located between the third wall portion 121 and the fourth wall portion 122. The third wall portion 121 defines a plurality of third grooves 1210. The fourth wall portion 122 defines a plurality of fourth grooves 1220. Both the plurality of third grooves 1210 and the plurality of fourth grooves 1220 communicate with the second receiving space 102. The plurality of third grooves 1210 are located adjacent to the first mating port 10*a*. The plurality of fourth grooves 1220 are located adjacent to the second mating port 10*b*.

Referring to FIG. 6 and FIG. 9, the top wall portion 11 includes a first wall surface 113 through which the first opening 110 extends. The bottom wall portion 12 includes a second wall surface 123 through which the second opening 120 extends. The first wall surface 113 includes an outer surface of the first wall portion 111 and an outer surface of the second wall portion 112. The second wall surface 123 includes an outer surface of the third wall portion 121 and an outer surface of the fourth wall portion 122.

Referring to FIG. 2, the insulating body 1 includes a third side wall portion 16 located in the receiving space. The third side wall portion 16 connects the first wall portion 111 and the second wall portion 112. The third side wall portion 16 divides the first receiving space 101 into a first partial space 1011 and a second partial space 1012. Referring to FIG. 6, the third side wall portion 16 divides the second receiving space 102 into a third partial space 1021 and a fourth partial space 1022. The first port 110 includes a first sub-port 110*a* and a second sub-port 110*b*. The second port 120 includes a third sub-port 120*a* and a fourth sub-port 120*b*. The first sub-port 110*a* communicates with the first partial space 1011. The second sub-port 110*b* communicates with the second partial space 1012. The third sub-port 120*a* communicates with the third subspace 1021. The fourth sub-port 120*b* communicates with the fourth partial space 1022.

Figure 13:
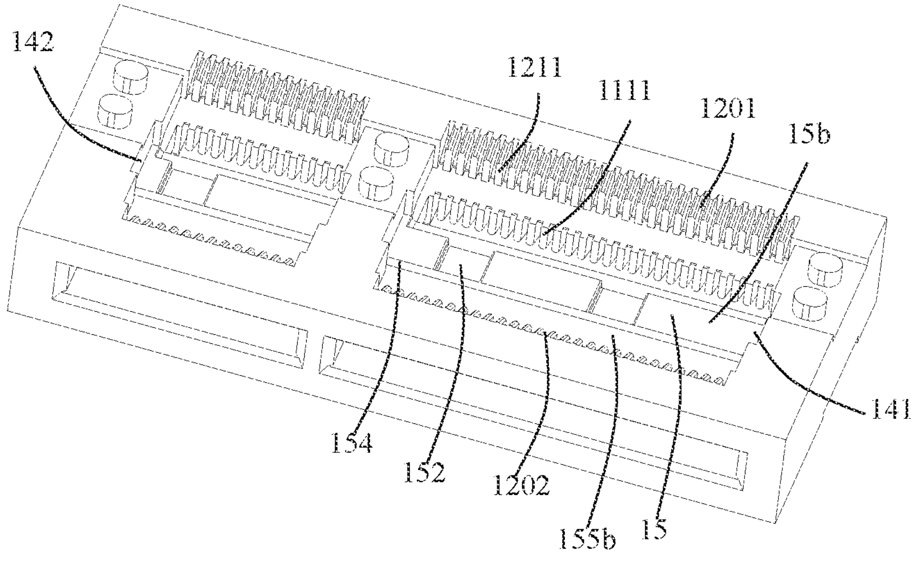
FIG. 13 is a schematic perspective view of an insulating body in FIG. 2.
Figure 14:
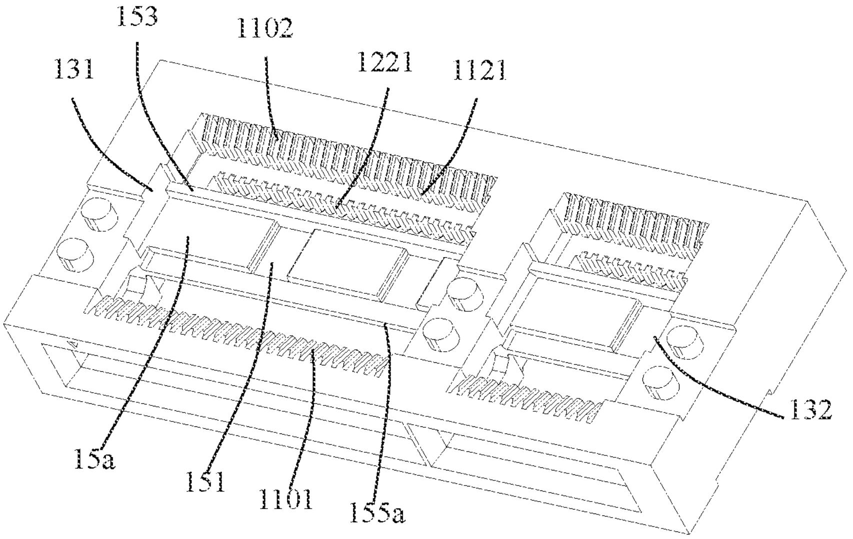
FIG. 14 is a schematic perspective view of FIG. 13 from another angle.

Referring to FIG. 13 and FIG. 14, the first wall portion 111 includes a first surface 1111. The second wall portion 112 includes a second surface 1121. The first grooves 1110 extend through the first surface 1111. The second grooves 1120 extend through the second surface 1121. Both the first surface 1111 and the second surface 1121 are exposed to the first receiving space 101. The first surface 1111 is opposite to the second surface 1121. The third wall portion 121 includes a third surface 1211. The fourth wall portion 122 includes a fourth surface 1221. The third grooves 1210 extend through the third surface 1211. The fourth grooves 1220 extend through the fourth surface 1221. Both the third surface 1211 and the fourth surface 1221 are exposed to the second receiving space 102. The third surface 1211 is opposite to the fourth surface 1221.

Specifically, referring to FIG. 10, the first wall portion 111 includes a first bottom surface 1112 located at a bottom of a corresponding first groove 1110. The second wall portion 112 includes a second bottom surface 1122 located at a bottom of a corresponding second groove 1120. Both the first bottom surface 1112 and the second bottom surface 1122 are inclined relative to a middle plane M of the insulating body 1. The middle plane M is located between the top wall portion 11 and the bottom wall portion 12. The third wall portion 121 includes a third bottom surface 1212 located at a bottom of a corresponding third groove 1210. The fourth wall portion 122 includes a fourth bottom surface 1222 located at a bottom of a corresponding fourth groove 1220. Both the third bottom surface 1212 and the fourth bottom surface 1222 are inclined relative to the middle plane M of the insulating body 1.

Referring to FIG. 14, each first groove 1110 has a first notch 1101. Each second groove 1120 has a second notch 1102. Both the first notch 1101 and the second notch 1102 communicate with the first opening 110. Referring to FIG. 13, each third groove 1210 has a third notch 1201. Each fourth groove 1220 has a fourth notch 1202. Both the third notch 1201 and the fourth notch 1202 communicate with the second opening 120.

Referring to FIG. 13 and FIG. 14, the insulating body 1 includes a support portion 15 connecting the first side wall portion 13 and the second side wall portion 14. The support portion 15 is located in the receiving space. The support portion 15 includes a first support surface **15*a* and a second support surface 15*b*. The first support surface 15*a* is located in the first receiving space 101. The first terminal module 2 is located opposed to the first support surface 15*a*. The second terminal module 3 is located opposed to the second support surface 15*b***.

Figure 3:
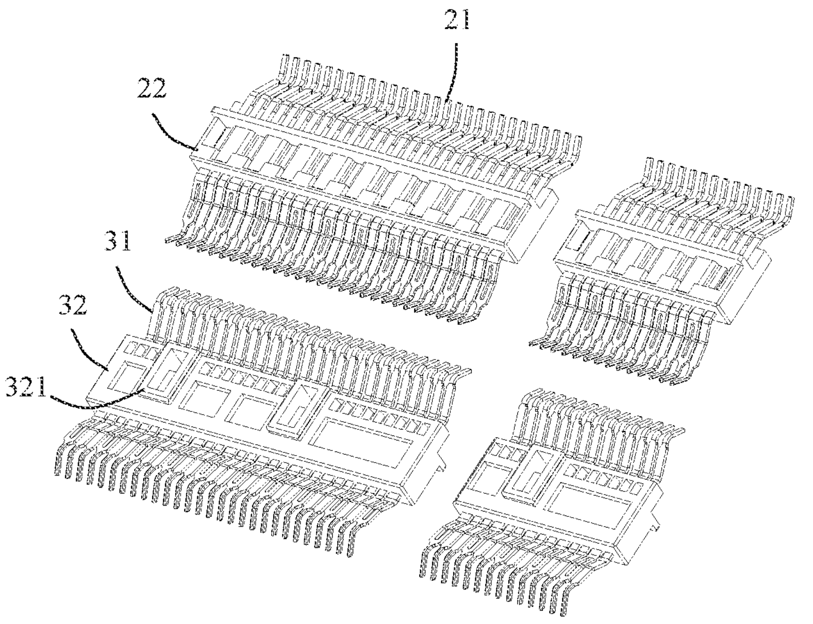
FIG. 3 is a partial perspective exploded view of FIG. 2.
Figure 7:
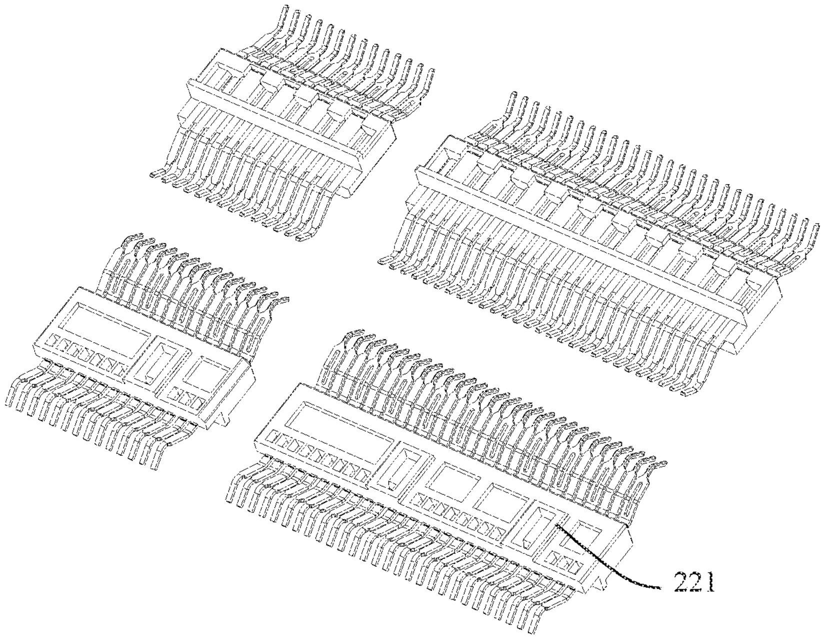
FIG. 7 is a partial perspective exploded view of FIG. 6.

In the illustrated embodiment of the present disclosure, referring to FIG. 13 and FIG. 14, the support portion 15 defines a first recess 151 recessed inwardly from the first support surface **15*a* and a second recess 152 recessed inwardly from the second support surface 15*b*. Referring to FIG. 3, the first terminal module 2 includes a plurality of first terminals 21 and a first insulating block 22. The plurality of first terminals 21 are fixed to the first insulating block 22. The first insulating block 22 abuts against the first support surface 15*a*. As shown in FIG. 7, the first insulating block 22 has a first protrusion 221 protruding into the first recess 151. Referring to FIG. 3, the second terminal module 3 includes a plurality of second terminals 31 and a second insulating block 32. The plurality of second terminals 31 are fixed to the second insulating block 32. The second insulating block 32 abuts against the second support surface 15*b*. Continuing to refer to FIG. 3, the second insulating block 32 has a second protrusion 321 protruding into the second recess 152. In this way, the positioning installation of the first terminal module 2 and the second terminal module 3** is realized.

Referring to FIG. 13 and FIG. 14, the support portion 15 includes a first abutting portion 153 protruding beyond the first support surface **15*a* and a second abutting portion 154 protruding beyond the second support surface 15*b*. The first insulating block 22 is capable of resisting against the first abutting portion 153. The second insulating block 32 is capable of resisting against the second abutting portion 154. The first abutting portion 153 restricts the position of the first terminal module 2, and the second abutting portion 154 restricts the position of the second terminal module 3, preventing the first terminal 21 and the second terminal 31** from moving along their length directions.

Figure 15:
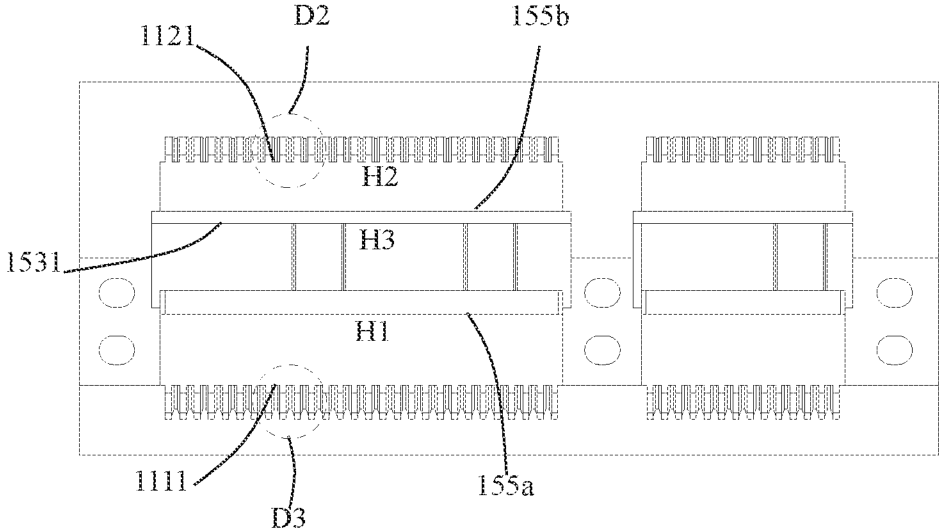
FIG. 15 is a top view of FIG. 14.
Figure 18:
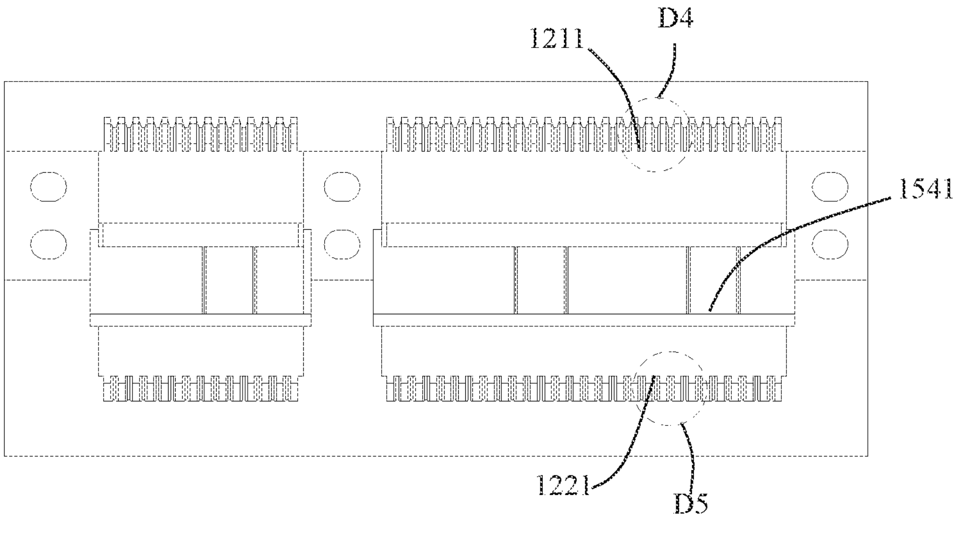
FIG. 18 is a top view of FIG. 13.

Referring to FIG. 15, the first abutting portion 153 includes a first abutting surface 1531. The first abutting surface 1531 is opposite to the first surface 1111 or the second surface 1121. The first insulating block 22 is in contact with the first abutting surface 1531. Referring to FIG. 18, the second abutting portion 154 includes a second abutting surface 1541. The second abutting surface 1541 is opposite to the third surface 1211 or the fourth surface 1221. The second insulating block 32 is in contact with the second abutting surface 1541. In the illustrated embodiment of the present disclosure, the first abutting surface 1531 is opposite to the first surface 1111. The second abutting surface 1541 is opposite to the third surface 1211.

Referring to FIG. 14, the first side wall portion 13 defines a first side groove 131 and a third side groove 132. Referring to FIG. 13, the second side wall portion 14 defines a second side groove 141 and a fourth side groove 142. The first side groove 131, the second side groove 141, the third side groove 132 and the fourth side groove 142 are all in communication with the receiving space. The first insulating block 22 extends into the first side groove 131 and the second side groove 141. The second insulating block 32 extends into the third side groove 132 and the fourth side groove 142. The first terminal module 2 is restricted by the first side groove 131 and the second side groove 141, and the second terminal module 3 is restricted by the third side groove 132 and the fourth side groove 142, preventing the first terminal 21 and the second terminal 31 from moving along their length directions.

Referring to FIG. 13 to FIG. 15, the support portion 15 has a first end surface **155*a* and a second end surface 155*b*. There is a first distance H1 between the first end surface 155*a* and a plane where the first surface 1111 is located. There is a second distance H2 between the second end surface 155*b* and a plane where the second surface 1121 is located. There is a third distance H3 between the first end surface 155*a* and the second end surface 155*b***. A value of the first distance H1 is greater than a value of the second distance H2. A value of the third distance H3 is not less than the value of the first distance H1.

Figure 23:
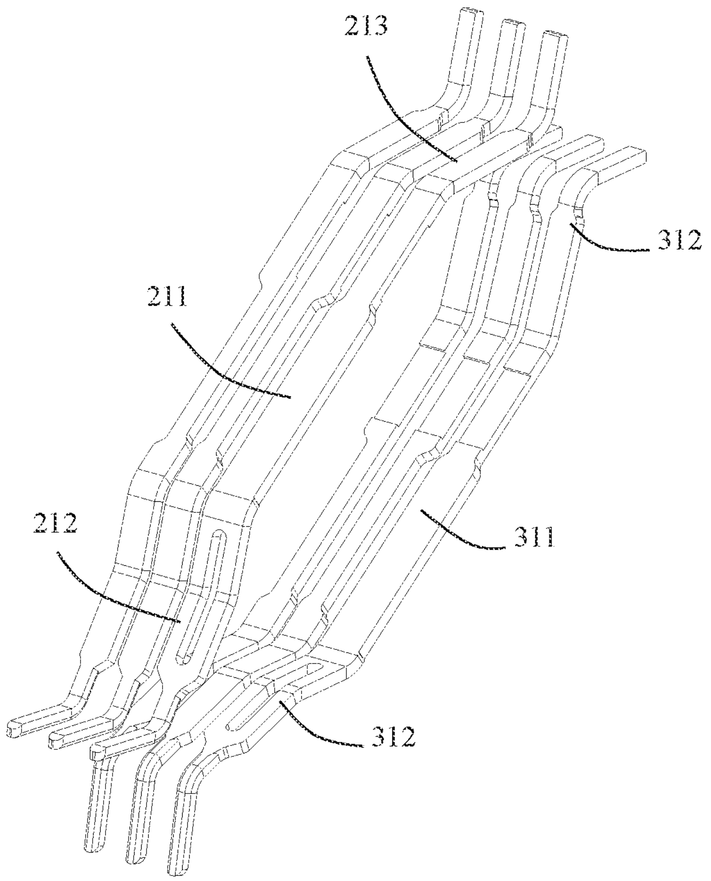
FIG. 23 is a perspective view of a first terminal and a second terminal in FIG. 4.

Referring to FIG. 23, each first terminal 21 includes a first main body 211, a first elastic arm 212 and a second elastic arm 213. The first elastic arm 212 extends from one end of the first main body 211, and the second elastic arm 213 extends from another end of the first main body 211. The first elastic arm 212 extends toward a direction adjacent to the first mating port **10*a*. The second elastic arm 213 extends toward a direction adjacent to the second mating port 10*b*. Each second terminal 31 includes a second main body 311, a third elastic arm 312 and a fourth elastic arm 313. The third elastic arm 312 extends from one end of the second main body 311, and the fourth elastic arm 313 extends from another end of the second main body 311. The third elastic arm 312 extends toward a direction adjacent to the first mating port 10*a*. The fourth elastic arm 313 extends toward a direction adjacent to the second mating port 10*b***.

The first elastic arm 212 at least partially extends into the corresponding first groove 1110, and the first elastic arm 212 is positioned through the corresponding first groove 1110. The second elastic arm 213 at least partially extends into the corresponding second groove 1120, and the second elastic arm 213 is positioned through the corresponding second groove 1120. The third elastic arm 312 at least partially extends into the corresponding third groove 1210, and the third elastic arm 312 is positioned through the corresponding third groove 1210. The fourth elastic arm 313 at least partially extends into the corresponding fourth groove 1220, and the fourth elastic arm 313 is positioned through the corresponding fourth groove 1220.

Figure 24:
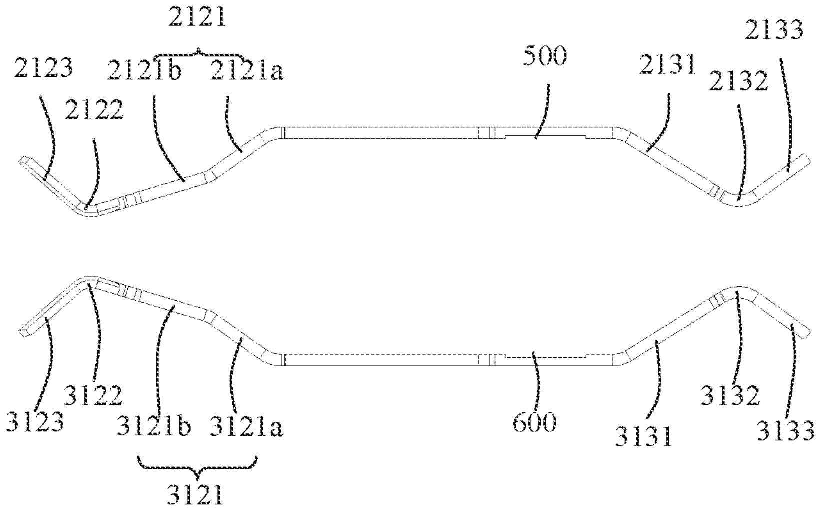
FIG. 24 is a front view of FIG. 23.
Figure 25:
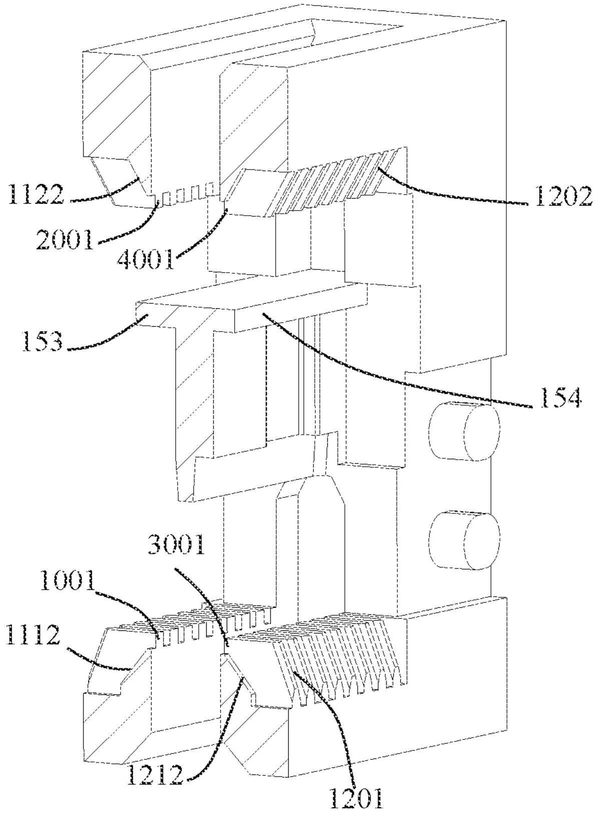
FIG. 25 is a perspective cross-sectional view of the insulating body.

Referring to FIG. 24, the first elastic arm 212 includes a first connecting portion 2121, a first mating portion 2122 connected to the first connecting portion 2121, and a first extension portion 2123 connected to the first mating portion 2122. The second elastic arm 213 includes a second connecting portion 2131, a second mating portion 2132 connected to the second connecting portion 2131, and a second extension portion 2133 connected to the second mating portion 2132. The first connecting portion 2121 and the second connecting portion 2131 are connected to two ends of the first main body 211. The third elastic arm 312 includes a third connecting portion 3121, a third mating portion 3122 connected to the third connecting portion 3121, and a third extension portion 3123 connected to the third mating portion 3122. The fourth elastic arm 313 includes a fourth connecting portion 3131, a fourth mating portion 3132 connected to the fourth connecting portion 3131, and a fourth extension portion 3133 connected to the fourth mating portion 3132. In the illustrated embodiment of the present disclosure, the first extension portion 2123 at least partially extends into the corresponding first groove 1110. The second extension portion 2133 at least partially extends into the corresponding second groove 1120. The third extension portion 3123 at least partially extends into the corresponding third groove 1210. The fourth extension portion 3133 at least partially extends into the corresponding fourth groove 1220. The first mating portion 2122 is located outside the corresponding first groove 1110. The second mating portion 2132 is located outside the corresponding second groove 1120. The third mating portion 3122 is located outside the corresponding third groove 1210. The fourth mating portion 3132 is located outside the corresponding fourth groove 1220. An end of the first extension portion 2123 and an end of the second extension portion 2133 are two free ends of the first terminal 21. An end of the third extension portion 3123 and an end of the fourth extension portion 3133 are two free ends of the second terminal 31.

The middle plane M is located between the first terminal module 2 and the second terminal module 3. The first connecting portion 2121, the second connecting portion 2131, the third connecting portion 3121, and the fourth connecting portion 3131 are all inclined in a direction adjacent to the middle plane M. The first connecting portion 2121 and the third connecting portion 3121 are symmetrical with respect to the middle plane M. The second connecting portion 2131 and the fourth connecting portion 3131 are symmetrical with respect to the middle plane M. The first extension portion 2123, the second extension portion 2133, the third extension portion 3123 and the fourth extension portion 3133 are all inclined in a direction away from the middle plane M. The first extension portion 2123 and the third extension portion 3123 are symmetrical with respect to the middle plane M. The second extension portion 2133 and the fourth extension portion 3133 are symmetrical with respect to the middle plane M.

Both the first connecting portion 2121 and the third connecting portion 3121 are bent structures. Referring to FIG. 24, in the illustrated embodiment of the present disclosure, the first connecting portion 2121 includes a first segment **2121*a* and a second segment 2121*b* connected to the first segment 2121*a*. The first segment 2121*a* is connected to the first main body 211. An inclination angle of the first segment 2121*a* relative to the first main body 211 is different from an inclination angle of the second segment 2121*b* relative to the first main body 211, so that the first connecting portion 2121 forms a bent structure. The third connecting portion 3121 includes a third segment 3121*a* and a fourth segment 3121*b* connected to the third segment 3121*a*. The third segment 3121*a* is connected to the second main body 311. An inclination angle of the fourth segment 3121*b* relative to the second main body 311 is different from an inclination angle of the fourth segment 3121*b* relative to the second main body 311, so that the third connecting portion 3121** forms a bent structure.

The first surface 1111, the second surface 1121, the third surface 1211 and the fourth surface 1221 are all perpendicular to the middle plane M. The first extension portion 2123 at least partially extends into the corresponding first groove 1110 obliquely relative to the middle plane M. The second extension portion 2133 at least partially extends into the corresponding second groove 1120 obliquely relative to the middle plane M. The third extension portion 3123 at least partially extends into the corresponding third groove 1210 obliquely relative to the middle plane M. The fourth extension portion 3133 at least partially extends into the corresponding fourth groove 1220 obliquely relative to the middle plane M. In the present disclosure, by setting the first bottom surface 1112, the second bottom surface 1122, the third bottom surface 1212 and the fourth bottom surface 1222 as inclined surfaces, it can be better adapted to the extension portions.

Specifically, the first extension portion 2123 is capable of passing through the first notch 1101 to be installed in the corresponding first groove 1110. The second extension portion 2133 is capable of passing through the second notch 1102 to be installed in the corresponding second groove 1120. The third extension portion 3123 is capable of passing through the third notch 1201 to be installed in the corresponding third groove 1210. The fourth extension portion 3133 is capable of passing through the fourth notch 1202 to be installed in the corresponding fourth slot 1220.

Figure 16:
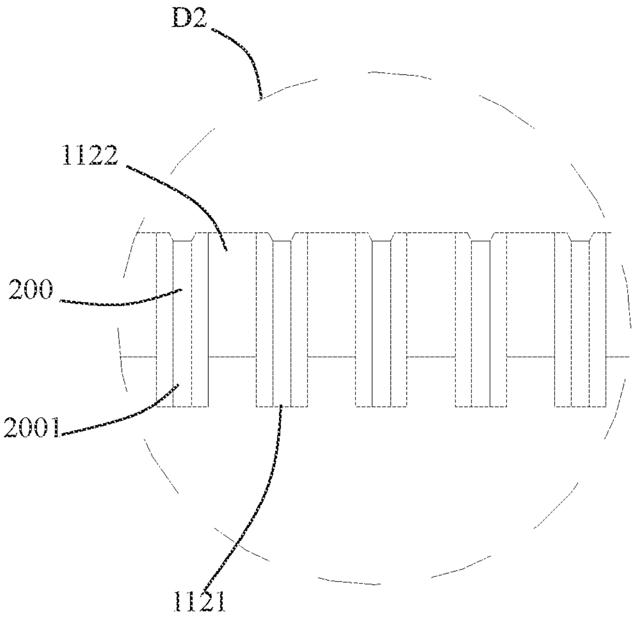
FIG. 16 is a partial enlarged view of area D2 in FIG. 15.
Figure 17:
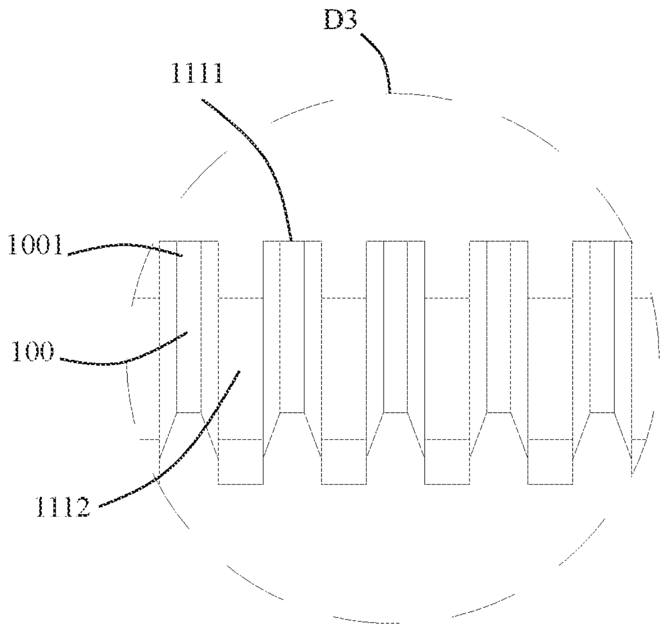
FIG. 17 is a partial enlarged view of area D3 in FIG. 15.
Figure 19:
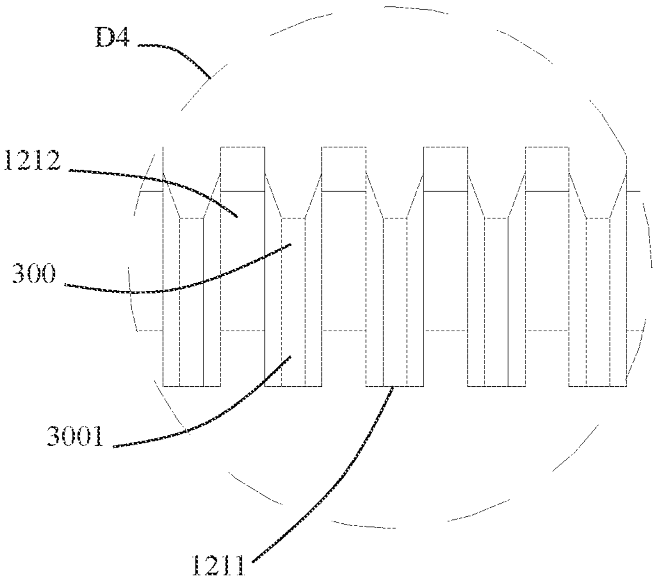
FIG. 19 is a partial enlarged view of area D4 in FIG. 18.
Figure 20:
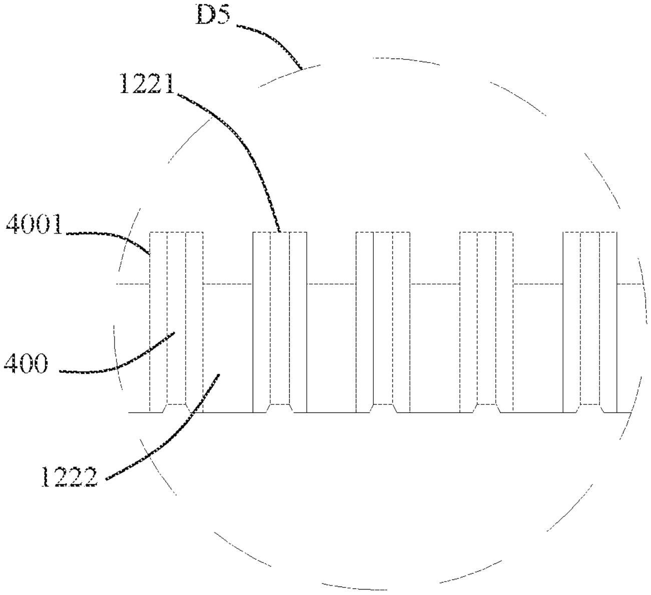
FIG. 20 is a partial enlarged view of area D5 in FIG. 18.
Figure 21:
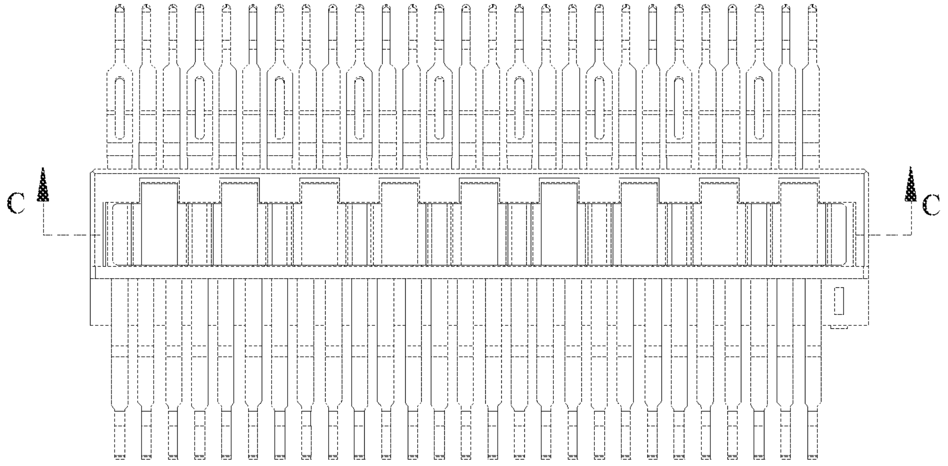
FIG. 21 is a partial top view of FIG. 8.
Figure 22:
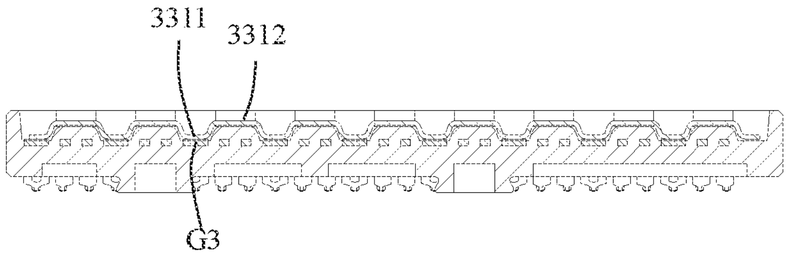
FIG. 22 is a schematic sectional view taken along line C-C in FIG. 21.

Referring to FIG. 16 and FIG. 17, a first plate portion 100 is formed between two adjacent first grooves 1110; and a second plate portion 200 is formed between two adjacent second grooves 1120. The first wall portion 111 includes a first protruding portion 1001 extending beyond the corresponding first groove 1110 from the first plate portion 100, and a second protruding portion 2001 extending beyond the corresponding second groove 1120 from the second plate portion 200. The first surface 1111 is located on the first protruding portion 1001. The second surface 1121 is located on the second protruding portion 2001. Referring to FIG. 19 and FIG. 20, a third plate portion 300 is formed between two adjacent third grooves 1210; and a fourth plate portion 400 is formed between two adjacent fourth grooves 1220. The third wall portion 121 includes a third protruding portion 3001 extending beyond the corresponding third groove 1210 from the third plate portion 300, and a fourth protruding portion 4001 extending beyond the corresponding fourth groove 1220 from the fourth plate portion 400. The third surface 1211 is located on the third protruding portion 3001. The fourth surface 1221 is located on the fourth protruding portion 4001. The first protruding portion 1001 is configured to restrict the position of the first extension portion 2123 without interfering with a vertical movement of the first extension portion 2123. The second protruding portion 2001 is configured to restrict the position of the second extension portion 2133 without interfering with a vertical movement of the second extension portion 2133. The third protruding portion 3001 is configured to restrict the position of the third extension portion 3123 without interfering with a vertical movement of the third extension portion 3123. The fourth protruding portion 4001 is configured to restrict the position of the fourth extension portion 3133 without interfering with a vertical movement of the fourth extension portion 3133.

Figure 4:
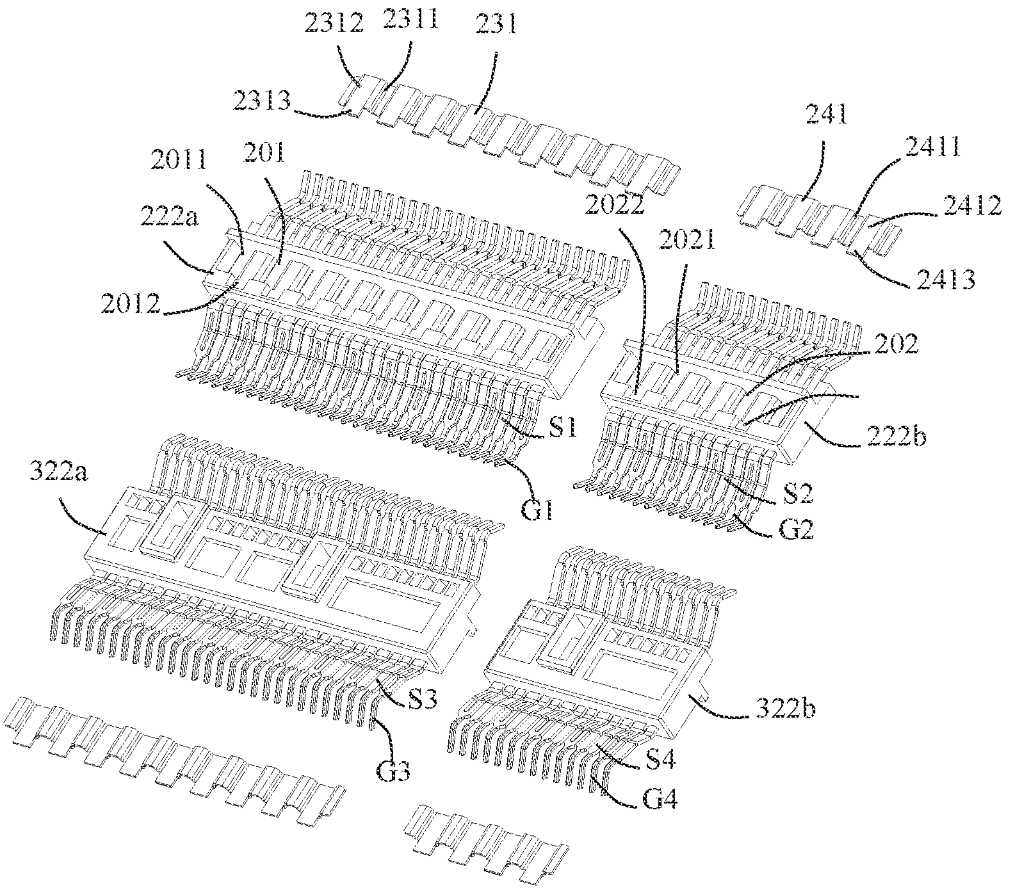
FIG. 4 is a perspective exploded view of FIG. 3.

Referring to FIG. 4, the first insulating block 22 includes a first partial insulating block 222*a* and a second partial insulating block 222*b*. The plurality of first terminals 21 include a plurality of pairs of first signal terminals S1, a plurality of first ground terminals G1, a plurality of pairs of second signal terminals S2 and a plurality of second ground terminals G2. The plurality of pairs of first signal terminals S1 and the plurality of first ground terminals G1 are fixed to the first partial insulating block 222*a*. The plurality of pairs of second signal terminals S2 and the plurality of second ground terminals G2 are fixed to the second partial insulating block 222*b*. The first partial insulating block 222*a* is installed in the first partial space 1011. The second partial insulating block 222*b* is installed in the second partial space 1012.

Continuing to refer to FIG. 4, the second insulating block 32 includes a third partial insulating block 322*a* and a fourth partial insulating block 322*b*. The plurality of second terminals 31 include a plurality of pairs of third signal terminals S3, a plurality of third ground terminals G3, a plurality of pairs of fourth signal terminals S4, and a plurality of fourth ground terminals G4. The plurality of pairs of third signal terminals S3 and the plurality of third ground terminals G3 are fixed to the third partial insulating block 322*a*. The plurality of pairs of fourth signal terminals S4 and the plurality of fourth ground terminals G4 are fixed to the fourth partial insulating block 322*b*. The third partial insulating block 322*a* is installed in the third partial space 1021. The fourth partial insulating block 322*b* is installed in the fourth partial space 1022.

As shown in FIG. 4, the first partial insulating block 222*a* has a first receiving groove 201. The second partial insulating block 222*b* has a second receiving groove 202. The first terminal module 2 includes a first shielding element 231 and a second shielding element 241. The first shielding element 231 is installed in the first receiving groove 201. The second shielding element 241 is installed in the second receiving groove 202.

Referring to FIG. 4, the first shielding element 231 includes a plurality of first engaging portions 2311 and a plurality of first bridging portions 2312. Two sides of each first bridging portion 2312 are connected to two first engaging portions 2311. The first main body 211 of the first ground terminal G1 is at least partially in contact with the first engaging portion 2311. The first shielding element 231 is not in contact with the first signal terminal S1 to avoid short circuit. The second shielding element 241 includes a plurality of second engaging portions 2411 and a plurality of second bridging portions 2412. Two sides of each second bridging portion 2412 are connected to two second engaging portions 2411. The first main body 211 of the second ground terminal G2 is at least partially in contact with the second engaging portion 2411. The second shielding element 241 is not in contact with the second signal terminal S2 to avoid short circuit.

The first shielding element 231 includes a first bridging extension portion 2313 extending from the first bridging portion 2312. The first receiving groove 201 has a first body groove 2011 for receiving the plurality of first engaging portions 2311 and the plurality of first bridging portions 2312, and a first extension groove 2012 communicating with the first body groove 2011. The first bridging extension portion 2313 is installed in the first extension groove 2012. The second shielding element 241 includes a second bridging extension portion 2413 extending from the second bridging portion 2412. The second receiving groove 202 has a second body groove 2021 for receiving the plurality of second engaging portions 2411 and the plurality of second bridging portions 2412, and a second extension groove 2022 communicating with the second body groove 2021. The second bridging extension portion 2413 is installed in the second extension groove 2022.

Figure 8:
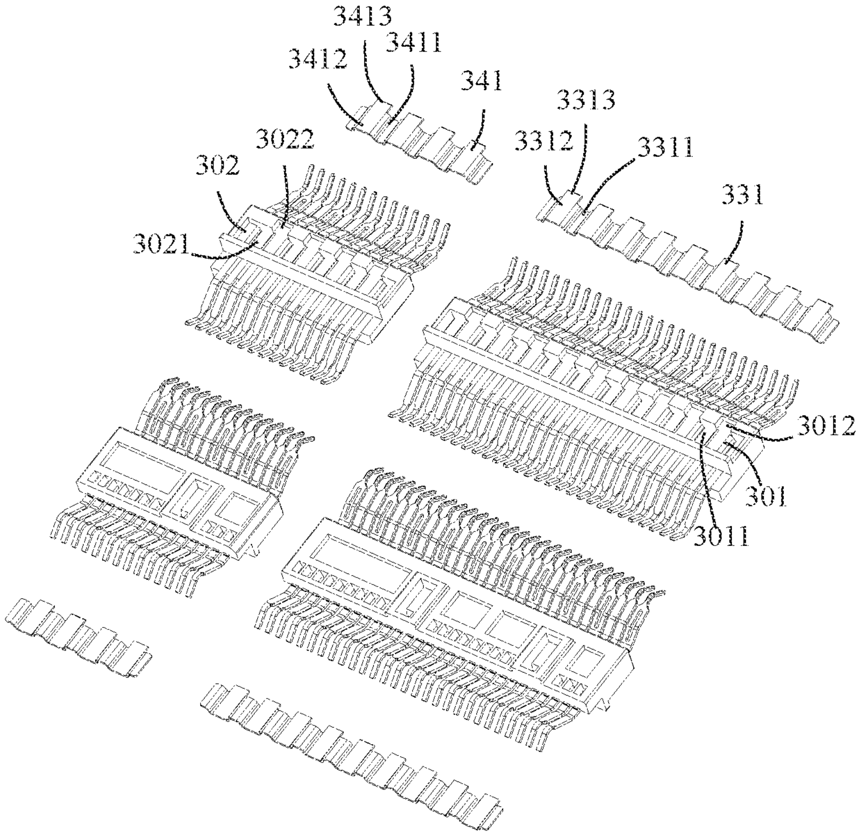
FIG. 8 is a perspective exploded view of FIG. 7.

Referring to FIG. 8, the third partial insulating block 322*a* has a third receiving groove 301. The fourth partial insulating block 322*b* has a fourth receiving groove 302. The second terminal module 3 includes a third shielding element 331 and a fourth shielding element 341. The third shielding element 331 is installed in the third receiving groove 301. The fourth shielding element 341 is installed in the fourth receiving groove 302.

Continuing to refer to FIG. 8, the third shielding element 331 includes a plurality of third engaging portions 3311 and a plurality of third bridging portions 3312. Two sides of each third bridging portion 3312 are connected to two third engaging portions 3311. The second main body 311 of the third ground terminal G3 is at least partially in contact with the third engaging portion 3311. The third shielding element 331 is not in contact with the third signal terminal S3 to avoid short circuit. The fourth shielding element 341 includes a plurality of fourth engaging portions 3411 and a plurality of fourth bridging portions 3412. Two sides of each fourth bridging portion 3412 are connected to two fourth engaging portions 3411. The second main body 311 of the fourth ground terminal G4 is at least partially in contact with the fourth engaging portion 3411. The fourth shielding element 341 is not in contact with the fourth signal terminal S4 to avoid short circuit.

As shown in FIG. 8, the third shielding element 331 includes a third bridging extension portion 3313 extending from the third bridging portion 3312. The third receiving groove 301 has a third body groove 3011 for receiving the plurality of third engaging portions 3311 and the plurality of third bridging portions 3312, and a third extension groove 3012 communicating with the third body groove 3011. The third bridging extension portion 3313 is installed in the third extension groove 3012. The fourth shielding element 341 includes a fourth bridging extension portion 3413 extending from the fourth bridging portion 3412. The fourth receiving groove 302 has a fourth body groove 3021 for receiving the plurality of fourth engaging portions 3411 and the plurality of fourth bridging portions 3412, and a fourth extension groove 3022 communicating with the fourth body groove 3021. The fourth bridging extension portion 3413 is installed in the fourth extension groove 3022.

Each of the first signal terminals S1, the first ground terminals G1, the second signal terminals S2 and the second ground terminals G2 includes the first main body 211, the first elastic arm 212 and the second elastic arm 213. The first mating portions 2122 of the first signal terminals S1, the first ground terminals G1, the second signal terminals S2, and the second ground terminals G2 are all located in a space between the first wall portion 111 and the support portion 15. The second mating portions 2132 of the first signal terminals S1, the first ground terminals G1, the second signal terminals S2, and the second ground terminals G2 are all located in a space between the second wall portion 112 and the support portion 15.

Each of the third signal terminals S3, the third ground terminals G3, the fourth signal terminals S4 and the fourth ground terminals G4 includes the second main body 311, the third elastic arm 312 and the fourth elastic arm 313. The third mating portions 3122 of the third signal terminals S3, the third ground terminals G3, the fourth signal terminals S4, and the fourth ground terminals G4 are all located in a space between the third wall portion 121 and the support portion 15. The fourth mating portions 3132 of the third signal terminals S3, the third ground terminals G3, the fourth signal terminals S4, and the fourth ground terminals G4 are all located in a space between the fourth wall portion 122 and the support portion 15.

Referring to FIG. 24, the first main body 211 of each of the first signal terminals S1, the first ground terminals G1, the second signal terminals S2, and the second ground terminals G2 is provided with a first bottom groove 500. The first insulating block 22 is formed at the first bottom groove 500, which can improve the holding force between the first terminal and the first insulating block 22. The second main body 311 of each of the third signal terminals S3, the third ground terminals G3, the fourth signal terminals S4 and the fourth ground terminals G4 is provided with a second bottom groove 600. The second insulating block 32 is formed at the second bottom groove 600 to improve the holding force between the second terminal and the second insulating block 32.

Referring to FIG. 2 and FIG. 6, the electrical connector includes a first cover plate 4 and a second cover plate 5. The first cover plate 4 covers the first opening 110. The second cover plate 5 covers the second opening 120. Both the first cover plate 4 and the second cover plate 5 are connected to the insulating body 1. The first cover plate 4 at least partially covers the first terminal module 2. The second cover plate 5 at least partially covers the second terminal module 3.

Referring to FIG. 2 and FIG. 6, the first side wall portion 13 defines a first installation groove 1301. The second side wall portion 14 defines a second installation groove 1401. The first cover 4 is installed in the first installation groove 1301 and the second installation groove 1401. The first side wall portion 13 defines a third installation groove 1302. The second side wall portion 14 defines a fourth installation groove 1402. The second cover plate 5 is installed in the third installation groove 1302 and the fourth installation groove 1402. The first installation groove 1301 and the third installation groove 1302 are respectively recessed on two surfaces of the first side wall portion 13 on opposite sides along its thickness direction. The second installation groove 1401 and the fourth installation groove 1402 are respectively recessed on two surfaces of the second side wall portion 14 on opposite sides along its thickness direction.

Referring to FIG. 2 and FIG. 6, a first post 133 is provided in the first installation groove 1301. A second post 143 is provided in the second installation groove 1401. The first cover plate 4 defines a first through hole 41 and a second through hole 42. The first post 133 extends into the first through hole 41. The insulating body 1 and the first cover 4 are fixed by melting the first post 133. The second post 143 extends into the second through hole 42. The insulating body 1 is fixed to the first cover 4 by melting the second post 143. A third post 134 is provided in the third installation groove 1302. A fourth post 144 is provided in the fourth installation groove 1402. The second cover plate 5 defines a third through hole 51 and a fourth through hole 52. The third post 134 extends into the third through hole 51. The insulating body 1 is fixed to the second cover 5 by melting the third post 134. The fourth post 144 extends into the fourth through hole 52. The insulating body 1 is fixed to the second cover 5 by melting the fourth post 144.

Referring to FIG. 2 and FIG. 6, the third side wall portion 16 defines a fifth installation groove 161 and a sixth installation groove 162. The fifth installation groove 161 and the sixth installation groove 162 are respectively recessed on two surfaces of the third side wall portion 16 on opposite sides along its thickness direction. A fifth post 163 is provided in the fifth installation groove 161. A sixth post 164 is provided in the sixth installation groove 162. The first cover plate 4 defines a fifth through hole 43. The second cover plate 5 defines a sixth through hole 53. The fifth post 163 extends into the fifth through hole 43. The insulating body 1 is fixed to the first cover 4 by melting the fifth post 163. The sixth post 164 extends into the sixth through hole 53. The insulation body 1 is fixed to the second cover 5 by melting the sixth post 164.

The first cover plate 4 presses the first insulating block 22 against the first support surface **15*a* of the support portion 15. The second cover plate 5 presses the second insulating block 32 against the second support surface 15*b* of the support portion 15**.

Compared with the prior art, technical benefits of the electrical connector of the present disclosure are as follows.

Each first terminal 21 includes the first elastic arm 212 and the second elastic arm 213. The insulating body 1 defines the first mating port **10*a* and the second mating port 10*b* correspondingly. The first mating module is capable of elastically contacting the first elastic arm 212 through the first mating port 10*a*; and the second mating module is capable of elastically contacting the second elastic arm 213 through the second mating port 10*b***, so as to realize bidirectional plugging.

The insulating body 1 positions the first elastic arm 212 by setting the first groove 1110, so that the first mating module can form reliable contact with the first mating portion 2122. The insulating body 1 positions the second elastic arm 213 by setting the second groove 1120, so that the second mating module can form reliable contact with the second mating portion 2132.

The insulating body 1 defines the first opening 110. The first terminal module 2 can be installed into the first receiving space 101 through the first opening 110, so that the first terminal module 2 is loaded into the insulating body 1 along the force direction of its contact point. It is beneficial to reduce the deformation of the first terminal module 2 along the force direction of its contact point, so that the first elastic arm 212 and the second elastic arm 213 are able to maintain good elasticity.

The above embodiments are only used to illustrate the present disclosure and not to limit the technical solutions described in the present disclosure. The understanding of this specification should be based on those skilled in the art. Descriptions of directions, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:

an insulating body defining a first receiving space, a first mating port and a second mating port; both the first mating port and the second mating port communicating with the first receiving space; the insulating body comprising a first wall portion and a second wall portion; the first wall portion defining a plurality of first grooves; the second wall portion defining a plurality of second grooves; the plurality of first grooves and the plurality of second grooves communicating with the first receiving space; the plurality of first grooves being located adjacent to the first mating port; the plurality of second grooves being located adjacent to the second mating port; and a first terminal module at least partially installed in the first receiving space; the first terminal module comprising a plurality of first terminals; each first terminal comprising a first main body, a first elastic arm extending from one end of the first main body, and a second elastic arm extending from another end of the first main body; the first elastic arm at least partially extending into a corresponding first groove to be positioned by the corresponding first groove; the second elastic arm at least partially extending into a corresponding second groove to be positioned by the corresponding second groove;

wherein the insulating body comprises a top wall portion, a first side wall portion, and a second side wall portion disposed opposite to the first side wall portion; the top wall portion defines a first opening communicating with the first receiving space; the first opening is configured to install the first terminal module into the first receiving space; the first side wall portion comprises a first installation groove and a first post protruding into in the first installation groove; the second side wall portion comprises a second installation groove and a second post protruding into in the second installation groove; and the first installation groove and the second installation groove are disposed on a same side of the insulating body;

wherein the electrical connector further comprises a first cover plate assembled and at least partially received in the first installation groove and the second installation groove; the first cover plate defines a first through hole to receive the first post and a second through hole to receive the second post; and the first cover plate covers the first opening and at least partially covers the first terminal module.

2. The electrical connector according to claim 1, wherein the first elastic arm comprises a first connecting portion connected to the first main body, a first mating portion connected to the first connecting portion, and a first extension portion connected to the first mating portion;

the second elastic arm comprises a second connecting portion connected to the first main body, a second mating portion connected to the first connecting portion, and a second extension portion connected to the second mating portion;

the first extension portion at least partially extends into the corresponding first groove; the second extension portion at least partially extends into the corresponding second groove.

3. The electrical connector according to claim 2, wherein the first wall portion comprises a first surface through which the plurality of first grooves extend; the second wall portion comprises a second surface through which the plurality of second grooves extend; both the first surface and the second surface are exposed to the first receiving space; and the first surface and the second surface are disposed opposite to each other.

4. The electrical connector according to claim 3, wherein the first wall portion comprises a first bottom surface located at a bottom of the corresponding first groove; the second wall portion comprises a second bottom surface located at a bottom of the corresponding second groove; both the first bottom surface and the second bottom surface are inclined relative to a middle plane of the insulating body; both the first surface and the second surface are perpendicular to the middle plane; the first extension portion at least partially extends into the corresponding first groove obliquely relative to the middle plane; and the second extension portion at least partially extends into the corresponding second groove obliquely relative to the middle plane.

5. The electrical connector according to claim 3, wherein a first plate portion is formed between two adjacent first grooves; a second plate portion is formed between two adjacent second grooves; the first wall portion comprises a first protruding portion extending beyond the corresponding first groove from the first plate portion and a second protruding portion extending beyond the corresponding second groove from the second plate portion; the first surface is located on the first protruding portion; and the second surface is located on the second protruding portion.

6. The electrical connector according to claim 2, wherein an opening direction of the first opening is different from opening directions the first mating port and the second mating port.

7. The electrical connector according to claim 6, wherein the opening direction of the first mating port extends along a first direction; the opening direction of the second mating port extends along a direction opposite to the first direction; the opening direction of the first opening extends along a second direction which is parallel to a thickness direction of the insulating body; and the second direction is perpendicular to the first direction.

8. The electrical connector according to claim 7, wherein the top wall portion comprises a first wall surface through which and the first opening extends; the top wall portion comprises the first wall portion and the second wall portion; and the first opening is located between the first wall portion and the second wall portion.

9. The electrical connector of claim 6, wherein the corresponding first groove has a first notch; the corresponding second groove has a second notch; both the first notch and the second notch communicate with the first opening; the first notch is configured for the first extension portion to be installed in the corresponding first groove; and the second notch is configured for the second extension portion to be installed in the corresponding second groove.

10. The electrical connector according to claim 1, wherein the first cover plate is fixed to the insulating body by melting the first post and the second post.

11. An electrical connector, comprising:

an insulating body defining a first receiving space, a first mating port extending through the insulating body along a first direction, and a second mating port extending through the insulating body along a direction opposite to the first direction; the first mating port and the second mating port being configured to receive a first mating module and a second mating module, respectively, along opposite directions; the insulating body comprising a first wall portion and a second wall portion which are located on a same side of the insulating body; the first wall portion defining a plurality of first grooves communicating with the first receiving space; the second wall portion defining a plurality of second grooves communicating with the first receiving space; the plurality of first grooves being disposed at intervals along a third direction; the plurality of second grooves being disposed at intervals along a fourth direction parallel to the third direction; and a first terminal module at least partially installed in the first receiving space along a second direction perpendicular to the first direction; the third direction being perpendicular to the first direction and the second direction; the first terminal module comprising a plurality of first terminals; each first terminal comprising a first main body, a first elastic arm and a second elastic arm; the first elastic arm and the second elastic arm extend along opposite directions from the first main body; a distal end of the first elastic arm at least partially extending into a corresponding first groove to be positioned by the corresponding first groove; a distal end of the second elastic arm at least partially extending into a corresponding second groove to be positioned by the corresponding second groove;

wherein the first wall portion comprises a first surface through which the plurality of first grooves extend; and the second wall portion comprises a second surface through which the plurality of second grooves extend;

wherein the first elastic arm comprises a first mating portion and a first extension portion connected to the first mating portion; and the second elastic arm comprises a second mating portion and a second extension portion connected to the second mating portion; and wherein the first wall portion comprises a first bottom surface located at a bottom of the corresponding first groove; the second wall portion comprises a second bottom surface located at a bottom of the corresponding second groove; both the first bottom surface and the second bottom surface are inclined relative to a middle plane of the insulating body; both the first surface and the second surface are perpendicular to the middle plane; the first extension portion at least partially extends into the corresponding first groove obliquely relative to the middle plane; and the second extension portion at least partially extends into the corresponding second groove obliquely relative to the middle plane.

12. The electrical connector according to claim 11, wherein the first elastic arm comprises a first connecting portion connected to the first main body, the first mating portion is connected to the first connecting portion; the distal end of the first elastic arm is formed on the first extension portion; and wherein the second elastic arm comprises a second connecting portion connected to the first main body, the second mating portion is connected to the first connecting portion; the distal end of the second elastic arm is formed on the second extension portion.

13. The electrical connector according to claim 12, wherein both the first surface and the second surface are exposed to the first receiving space; and the first surface and the second surface are disposed opposite to each other along the first direction.

14. The electrical connector according to claim 13, wherein a first plate portion is formed between two adjacent first grooves; a second plate portion is formed between two adjacent second grooves; the first wall portion comprises a first protruding portion extending beyond the corresponding first groove from the first plate portion and a second protruding portion extending beyond the corresponding second groove from the second plate portion; the first surface is located on the first protruding portion; and the second surface is located on the second protruding portion.

15. The electrical connector according to claim 12, wherein the insulating body comprises a top wall portion; the top wall portion defining a first opening communicating with the first receiving space; the first opening extends through the top wall portion along the third direction; the first opening is configured to install the first terminal module into the first receiving space.

16. The electrical connector according to claim 15, wherein the top wall portion comprises a first wall surface through which and the first opening extends; the top wall portion comprises the first wall portion and the second wall portion; and the first opening is located between the first wall portion and the second wall portion.

17. The electrical connector according to claim 15, further comprising a first cover plate covering the first opening; the first cover plate being connected with the insulating body; and the first cover plate at least partially covering the first terminal module.

18. An electrical connector, comprising:

an insulating body defining a first receiving space, a second receiving space, a first mating port extending through the insulating body along a first direction, and a second mating port extending through the insulating body along a direction opposite to the first direction; the first mating port and the second mating port being configured to receive a first mating module and a second mating module, respectively, along opposite directions; the insulating body comprising a first wall portion, a second wall portion, a first opening located between the first wall portion and the second wall portion, a third wall portion, a fourth wall portion and a second opening located between the third wall portion and the fourth wall portion; the first wall portion and the second wall portion being located on a first side of the insulating body; the third wall portion and the fourth wall portion being located on a second side of the insulating body opposite to the first side; the first wall portion defining a plurality of first grooves communicating with the first receiving space; the second wall portion defining a plurality of second grooves communicating with the first receiving space; the third wall portion defining a plurality of third grooves communicating with the second receiving space; the fourth wall portion defining a plurality of fourth grooves communicating with the second receiving space;

a first terminal module at least partially installed into the first receiving space through the first opening along a second direction perpendicular to the first direction; the first terminal module comprising a plurality of first terminals; at least one first terminal comprising a first main body, a first elastic arm and a second elastic arm; the first elastic arm and the second elastic arm extend along opposite directions from the first main body; a distal end of the first elastic arm at least partially extending into a corresponding first groove to be positioned by the corresponding first groove; a distal end of the second elastic arm at least partially extending into a corresponding second groove to be positioned by the corresponding second groove; and a second terminal module at least partially installed into the second receiving space through the second opening along a direction opposite to the second direction; the second terminal module comprising a plurality of second terminals; at least one second terminal comprising a second main body, a third elastic arm and a fourth elastic arm; the third elastic arm and the fourth elastic arm extend along opposite directions from the second main body; a distal end of the third elastic arm at least partially extending into a corresponding third groove to be positioned by the corresponding third groove; a distal end of the fourth elastic arm at least partially extending into a corresponding fourth groove to be positioned by the corresponding fourth groove;

wherein the insulating body comprises a first side wall portion and a second side wall portion disposed opposite to the first side wall portion; the first receiving space and the second receiving space are located between the first side wall portion and the second side wall portion; the first side wall portion defines a first installation groove and a third installation groove disposed opposite to the first installation groove in the second direction; the second side wall portion defines a second installation groove and a fourth installation groove disposed opposite to the second installation groove in the second direction; the first installation groove and the second installation groove are disposed on a same side of the insulating body; and the third installation groove and the fourth installation groove are disposed on another same side of the insulating body;

wherein the electrical connector further comprises a first cover plate and a second cover plate; the first cover plate is assembled and at least partially received in the first installation groove and the second installation groove; the second cover plate is assembled and at least partially received in the third installation groove and the fourth installation groove; and the first cover plate and the second cover plate are fixed to the insulating body along opposite directions to cover the first opening and the second opening, respectively.

19. The electrical connector according to claim 18, wherein the first side wall portion comprises a first post protruding into in the first installation groove and a third post protruding into the third installation groove; the second side wall portion comprises a second post protruding into in the second installation groove and a fourth post protruding into the fourth installation groove; the first cover plate defines a first through hole to receive the first post, a second through hole to receive the second post, a third through hole to receive the third post, and a fourth through hole to receive the fourth post; the first cover plate is fixed to the insulating body by melting the first post and the second post; and the second cover plate is fixed to the insulating body by melting the third post and the fourth post.

* * * * *